United States Patent [19]

Hahn

[11] Patent Number: 4,823,592
[45] Date of Patent: Apr. 25, 1989

[54] TEST APPARATUS FOR PROVING THE PERFORMANCE OF MASS FLOW METERS

[75] Inventor: David T. Hahn, Longmont, Colo.

[73] Assignee: Micro Motion, Inc., Boulder, Colo.

[21] Appl. No.: 153,281

[22] Filed: Feb. 5, 1988

[51] Int. Cl.$^4$ .............................................. G01F 25/00
[52] U.S. Cl. .......................................................... 73/3
[58] Field of Search ...................................... 73/3, 1 R

[56] References Cited

U.S. PATENT DOCUMENTS

| | | | |
|---|---|---|---|
| Re. 31,450 | 11/1983 | Smith | 73/861.38 |
| 3,034,331 | 5/1962 | Brueckner | 73/3 |
| 3,035,434 | 5/1962 | St. Clair | 73/3 |
| 3,212,318 | 10/1965 | Lomax | 73/3 |
| 3,226,973 | 1/1966 | Evans et al. | 73/3 |
| 3,475,949 | 11/1969 | Truhan | 73/3 |
| 3,937,048 | 2/1976 | St. Clair | 73/3 |
| 3,958,443 | 5/1976 | Berrettini | 73/3 |
| 4,027,523 | 6/1977 | St. Clair | 73/3 |
| 4,422,338 | 12/1983 | Smith | 73/861.38 |
| 4,502,318 | 3/1985 | Converse, III et al. | 73/3 |
| 4,570,476 | 2/1986 | Davis | 73/1 R |
| 4,619,134 | 10/1986 | Böhm et al. | 73/3 |
| 4,667,503 | 5/1987 | Loos | 73/3 |
| 4,671,097 | 6/1987 | Kurki et al. | 73/3 |

OTHER PUBLICATIONS

Liu: "Application of Mass Flow Meter for Allocation Measurements of Crude Oil Prod.", SPE 15394 (1986): 8 pages.
Hobart, H. F., An Automated Secondary Standard for Calibrating Liquid Flow Meters, ISA ASI 76233, pp. 205-209 (1976).
DRT Digital Rate Totalizer, Mar. 1987, Instruction Manual, Micro Motion, Inc., Boulder, Colorado.
Dowtherm A Heat Transfer Fluid Form No. 176-13-37-83, Dow Chemical Company, Midland, MI.; pub. by Jan. 1983.
Syltherm 800-Heat Transfer Liquid, Form No. 22-85-7A-82, Dow Corning, Midland, MI., pub. 1981.
Weigh-Tronix Low Profile and Desk Scales, FS-681, Weigh-Tronix, Inc., Fairmont, MN.; pub. by Feb. 1988.

*Primary Examiner*—Tom Noland
*Attorney, Agent, or Firm*—Peter L. Michaelson

[57] ABSTRACT

Test apparatus for proving the performance of Coriolis mass flow meters when measuring high-temperature fluid. Selected heat transfer fluid, preferably organic, is heated to the desired testing temperature and pumped from a fluid reservoir and heater through the meter being tested. A batch tank receives the fluid passing the meter and the tank is weighed before and after the test to prove the meter. All conduits connecting to the batch tank are flexible and the weighing scales operate with a minimum of deflection. An inert gas blanket is maintained in the fluid reservoir and the batch tank to maintain the selected organic fluid in a liquid state. The components of the apparatus are mounted on a platform and the apparatus can be easily transported for testing meters in the field.

10 Claims, 3 Drawing Sheets

TEST APPARATUS FOR PROVING THE PERFORMANCE OF MASS FLOW METERS

BACKGROUND OF THE INVENTION

1. Field of the Invention

This invention relates to test apparatus for fluid mass flow meters and, more particularly, to test apparatus which measures accurately the mass flow of high-temperature fluid passing through the meter undergoing test.

2. Background

Coriolis mass flow meters are well known in the art and are generally described in the following U.S. Pat. Nos. Re. 31,450, dated Nov. 29, 1983 to Smith; 4,422,338 dated Dec. 27, 1983 to Smith; and 4,491,025 dated Jan. 1, 1985 to Smith et al. Such meters have been adapted to measure the total fluid mass flow therethrough and to register same as a digital readout as described in Instruction Manual 10006 18-3-87-C entitled "DRT Digital Rate Totalizer", March, 1987, Micro Motion, Inc., Boulder, CO.

The meters are accurately calibrated at the time of manufacture. It is desirable in some cases to be able to check or prove the accuracy of the meter calibration in the field and this is particularly true in the case of meters designed to measure the mass flow of high-temperature fluids where expansion and other problems can be encountered.

Apparatus for proving and/or calibrating the performance of meters is well known in the art. The simplest system is to measure the fluid passing the meter, collect the fluid in a weigh tank and weigh same. Conducted at ambient temperatures and pressures, the apparatus can be designed with so-called open loop system wherein there need be no connection between the fluid feed lines to the tank and the weigh tank itself. When the fluid being measured is at a relatively high temperature, it is desirable to couple the weigh tank to the meter with flexible conduits to minimize the effects of the connecting piping on the weight measurements and such a construction is shown in Liu, K. T., "Application of Mass Flow Meter for Allocation Measurement of Crude Oil Production", SPE, 1986. A similar teaching is to be found in U.S. Pat. No. 3,212,318 dated Oct. 19, 1965 to Lomax.

A weight tank formed as a pressure vessel is shown in U.S. Pat. No. 3,034,331 dated May 15, 1962 to Brueckner. This is used in conjunction with volatile or flammable fluids. Other types of proving systems are also known and include apparatus for proving cryogenic meters, see U.S. Pat. No. 3,958,443 dated May 25, 1986 to Berrettini. U.S. Pat. No. 3,475,949 dated Nov. 4, 1969 to Truhan discloses using a heated or cooled fluid to heat or cool gas to a predetermined temperature prior to measuring the flow of the gas.

Various other U.S. patents and literature disclose different combinations of piping and measuring techniques and include the following: U.S. Pat. No. 3,035,434 dated May 22, 1962 to St. Clair; U.S. Pat. No. 3,226,973 dated Jan. 1, 1966 to Evans et al.; U.S. Pat. No. 3,937,048 dated Feb. 10, 1976 to St. Clair et al; U.S. Pat. No. 4,027,523 dated June 7, 1977 to St. Clair; U.S. Pat. No. 4,502,318 dated Mar. 5, 1985 to Converse et al. and Hobart, H. F., "An Automated Secondary Standard for Calibrating Liquid Flow Meters", ISA ASI176233, 1976, pp. 205-209.

SUMMARY OF THE INVENTION

There is provided a test apparatus for accurately measuring the mass flow rate of high-temperature fluid passing through the meter being tested so that the meter can be accurately calibrated, if required, to register accurately the mass flow therethrough of the high-temperature fluid. The apparatus is adapted to be connected to the fluid inlet and the fluid outlet of the meter to be tested and includes a reservoir tank means for retaining selected heat transfer fluid to be passed through the meter during testing. The heat transfer fluid has the characteristic of remaining fluid at the elevated temperatures at which mass flow is to be measured with only a relatively low pressure of inert gas blanket maintained thereover. A fluid pump means has an inlet connected to the outlet of the reservoir tank and the pump is operable to pump the heat transfer fluid through the test apparatus.

A heat transfer fluid heater means is operable to heat the heat transfer fluid passing therethrough to the temperature at which the meter is to be tested. The heater has an inlet connected to the outlet of the pump and a first fluid flow control valve is connected between the inlet of the meter being tested and the outlet of the heater.

A batch tank means is operable to receive and retain the fluid passed through the meter during testing of same. All conduits connecting to the batch tank are flexible so that they will not influence weight measurements of the batch tank. The inlet for the batch tank is connected through a second fluid flow control valve to the outlet of the meter. The outlet of the batch tank connects through a third fluid flow control valve to the inlet of the reservoir tank.

An inert gas supply means connects to the batch tank and the reservoir tank to maintain therein a predetermined gas pressure sufficient to maintain the heated transfer fluid in a liquid state. Means are provided for causing the fluid to flow from the batch tank to the reservoir tank when either the first or second fluid flow control valve is closed and the third fluid flow control valve is opened.

A weighing means is associated with the batch tank for weighing same at the start of a test run and also at the end of a test run. The weighing means operates with a minimum of deflection to eliminate any errors which might occur due to deflection in the flexible conduits.

BRIEF DESCRIPTION OF THE DRAWINGS

For a better understanding of the invention, reference should be had to the accompanying drawings wherein.

DETAILED DESCRIPTION

Figure 1:
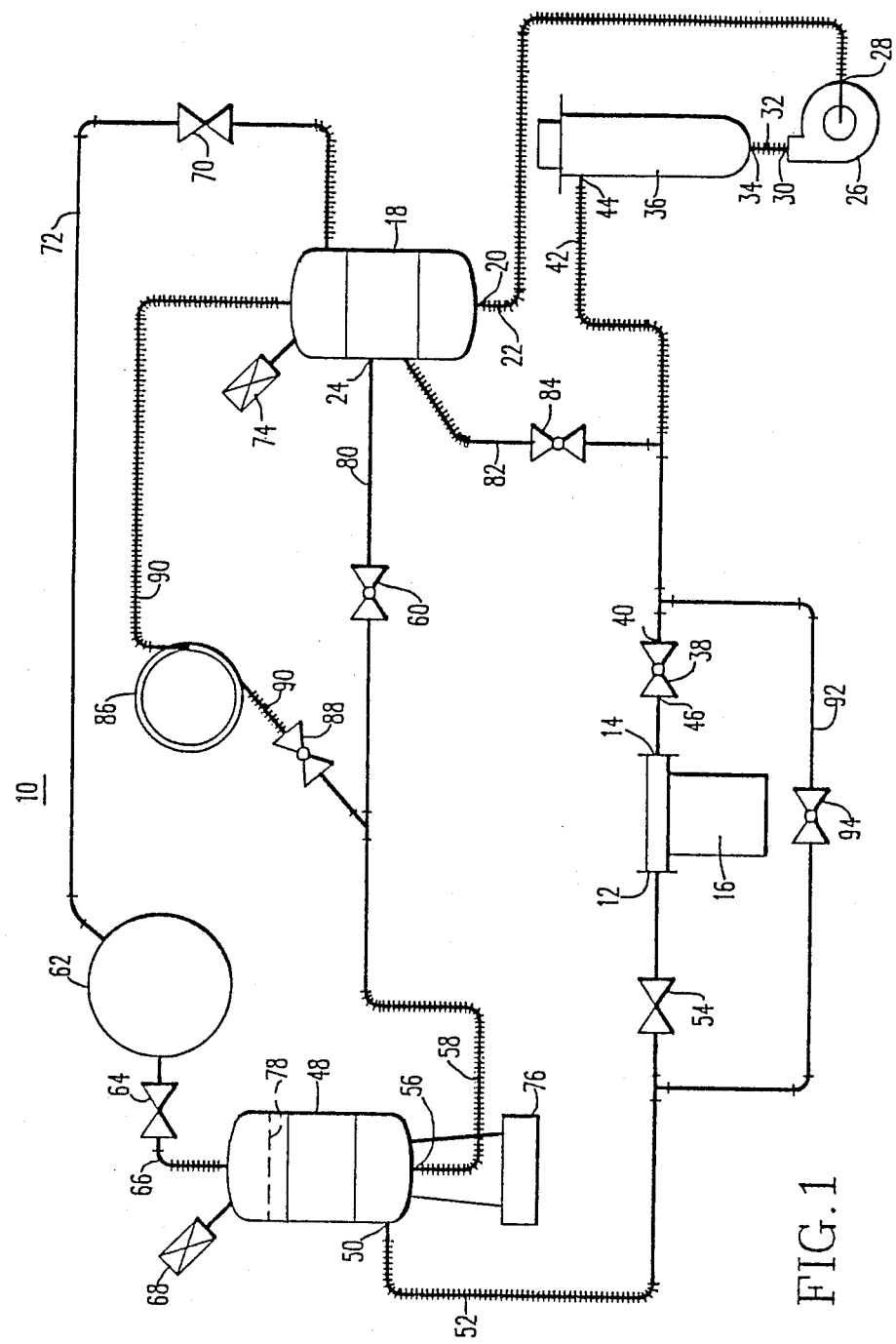
FIG. 1 is a schematic "plumbing" diagram of the present test apparatus.

With specific reference to the form of the invention as illustrated in the drawings, the apparatus 10 is best described by reference to the schematic plumbing diagram as shown in FIG. 1. The apparatus is adapted to be connected to the fluid outlet 12 and the fluid inlet 14 of the meter 16 being tested in order to accurately calibrate the meter, if required, to register accurately the mass flow of the high-temperature fluid. The Coriolis mass flow meters being tested, as described hereinbefore, are equipped with a digital rate totalizer which provides a digital readout of the total mass of fluid passing therethrough, as well as the rate of flow, if this latter information is desired. Such a totalizer is described in detail in DRT Digital Rate Totalizer Instruction Manual, referenced in the background section.

The basic apparatus comprises a reservoir tank means 18 for retaining selected heat transfer fluid to be passed through the meter to be tested. This particular heat transfer fluid has the characteristic of remaining fluid at the elevated temperatures at which mass fluid flow is to be measured with only a relatively low pressure of inert gas blanket maintained thereover. Preferably, an organic material is used for the heat transfer fluid. Accordingly, the remainder of this specification will refer to an organic heat transfer fluid. However, it should be realized that inorganic molten salts and silicone based fluids can also be used as well as combinations of organic and inorganic materials that meet the above criteria of fluidity at elevated temperatures and relatively low pressure can also be used. The inorganic materials and mixtures of inorganic and organic materials are considered to be within the term "organic fluid" as that term is used herein.

As a specific example, for a measured temperature of 400° C., an organic heat transfer fluid sold under the trademark "Dowtherm A" by Dow Chemical Co. is very suitable. This is a mixture of two very stable organic compounds, diphenyl and diphenyl oxide. Other suitable compounds are described in Dow Chemical Co. booklet entitled "Dowtherm Organic Heat Transfer Fluids, Form No. 176-1337-83." Another suitable fluid for high temperature applications is marketed and manufactured by Dow Corning Co., Midland, MI under the trademark "Syltherm" 800. This material is described in U.S. Pat. No. 4,193,885 and is a polydimethylsiloxane fluid that is characterized as being semi-inorganic in nature by its manufacturer. The use of such material in high-temperature applications using an expansion tank with a nitrogen blanket is described in Dow Corning Booklet Form No. 22-857A-82. The reservoir tank 18 has a fluid outlet 20 which connects to a conduit 22 which is preferably flexible to minimize vibrations. The fluid inlet 24 for the reservoir tank connects to an inlet conduit and will be described hereinafter.

A fluid pump means 26 has an inlet 28 which is in fluid connection with the fluid outlet 20 of the reservoir tank 18. The pump means is operable to pump the selected organic fluid through the test apparatus. The fluid outlet 30 of the pump 26 connects through a conduit 32 to the fluid inlet 34 of a fluid heater means 36. The heater means 36 is operable to heat the organic fluid passing therethrough to the predetermined temperature at which the meter is to be tested. The conduit 32 is preferably flexible to minimize vibrations and the heater means 36 is electically heated.

A first fluid flow control valve 38 is operable to control the rate of fluid flow therethrough, either on an on-off basis or to adjust the rate of fluid flow. The valve inlet 40 connects through a conduit 42, which is preferably flexible, to the fluid outlet 44 of the heater means 36. The outlet 46 of the first fluid flow control valve 38 is adapted to be connected to the inlet 14 of the meter 16 undergoing test.

A batch tank means 48 receives and retains the fluid which is passed through the meter undergoing test. The fluid inlet 50 of the batch tank connects through a flexible conduit 52 to a second fluid control valve 54 which in turn is adapted to be connected to the outlet 12 of the meter being tested. The second fluid control valve 54 can also be operated to control flow on and on-off basis or to adjust the rate of fluid flow. The fluid outlet 56 of the batch tank connects through a flexible conduit 58 and a third fluid flow control valve 60 to the inlet 24 of the reservoir tank 18.

An inert gas supply means 62, preferably nitrogen, connects through a pressure control valve 64 and a flexible conduit 66 to the batch tank 48. A pressure relief valve 68 operates to maintain a constant blanket pressure of nitrogen within the batch tank when fluid is being pumped therein. This blanket pressure is predetermined to maintain the heated organic fluid in a liquid state at the predetermined temperature at which the meter is to be tested. As a specific example, for testing at a temperature of 400° C., a blanket pressure of 250 psi is suitable.

The inert gas supply means 62 also connects through a second pressure control valve 70 to the reservoir tank 18 by a separate gas conduit 72. In similar fashion, a second pressure relief valve 74 connects to the reservoir tank 18 to maintain therein a predetermined pressure of inert gas, such as nitrogen. In addition the batch tank 48 and the reservoir tank 18 can be interconnected via a valved gas conduit (not shown). With the gas flow control valve in this valved gas conduit open, the pressures in both tanks 18 and 48 could be equalized simplifying the pressurization of the entire test apparatus. This would also avoid over-pressurization of the batch tank and venting of the inert gas to atmosphere during fluid filling as the inert gas therein would be vented into the reservoir tank which is being emptied of fluid.

In operation of the apparatus, the batch tank 48 is gradually filled with the fluid being measured, at which time second flow control valve 60 is closed and first flow control valve 38 and the second fluid flow control valve 54 are opened. During the filling of the batch tank 48, the gas pressure relief valve 68 maintains a constant blanket pressure of nitrogen over the fluid being pumped. The first flow control valve 38 or the second fluid control valve 54 is then closed.

A weighing means or scale 76 is associated with the batch tank 48 for weighing same at the start of a test run and also when partially filled with the heated fluid at the end of a test run, with the level of fluid 78 at the end of a test run shown by dashed line. The scale is selected to measure the weight of the batch tank with only a minimum of deflection to eliminate any measured weight errors which might occur due to any appreciable distortion in the flexible conduits which connect to the batch tank 48. A strain-gauge type of scale meets these requirements and a suitable scale is marketed by Weigh-Tronix, Inc. of Fairmont, MN. These scales are not affected by varying ambient conditions and can withstand routine shocks and jolts without going out of adjustment.

After the weight measurements are taken, the valve 60 is opened to permit the fluid to pass from the batch tank 48 to the reservoir tank 18. This flow of fluid can be accomplished by a gravity flow, by a small pressure differential between the gas blankets in the two tanks, or by a small additional pump placed in the conduit 80 which connects the two tanks.

At the end of the test run, the mass flow of the fluid as registered by the meter 16 is checked against the measured weight of the fluid in the batch tank and any necessary changes in meter calibration are made.

To facilitate heating the organic fluid in a uniform manner, it is desirable to include a circulating conduit 82 and a fourth fluid flow control valve 84 between the outlet 44 of the heater 36 and the reservoir tank 18. In this manner by closing the first fluid flow control valve 38 and opening the valve 84 the fluid can be continuously circulated through the heater until a desired and uniform temperature is achieved. The valve 84 is then closed and the apparatus is ready for a test run using high-temperature fluid.

For some testing, it may be desirable to conduct a series of test runs starting at elevated temperatures with subsequent test runs conducted at progressively lower temperatures. To facilitate such a testing procedure, a fluid cooling means 86 and a cooling fluid flow control valve 88 are connected by a suitable conduit 90 between the outlet 56 of the batch tank 48 and the reservoir tank 18. In such a test run, the batch tank 48 is drained to the reservoir tank 18 through the cooling coil 86 with the flow control valve 60 remaining closed.

It may be desirable to test the apparatus prior to an actual test run and to facilitate such a procedure, a by-pass conduit 92 and a by-pass fluid flow control valve 94 connect between the outlet 44 of the heater and the inlet 50 of the batch tank 48 so that the meter to be tested can be by-passed. The valves 38 and 54 would normally be closed.

Figure 3:
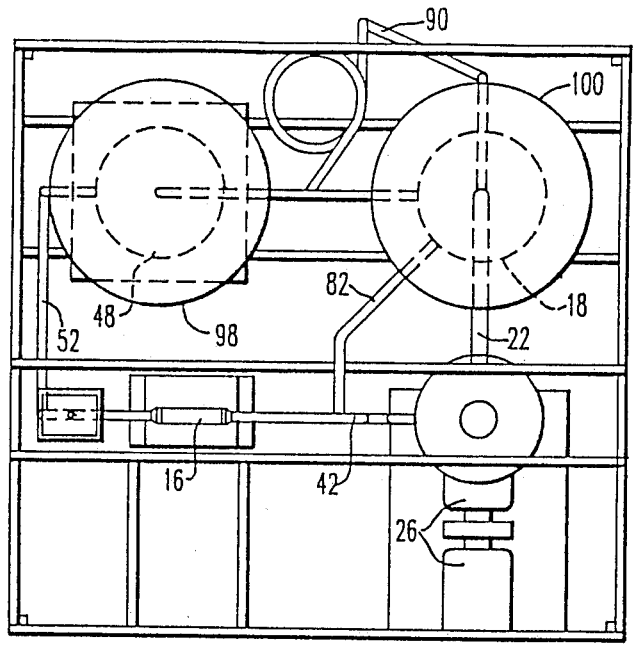
FIG. 3 is a top view of the apparatus as shown in FIG. 2.
Figure 2:
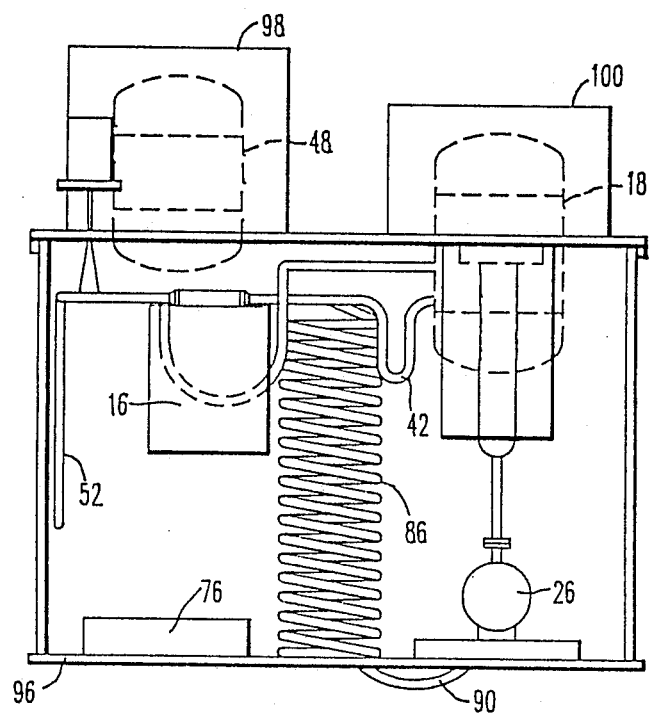
FIG. 2 is an elevational view of the apparatus in portable form suitable for testing in the field.
Figure 4:
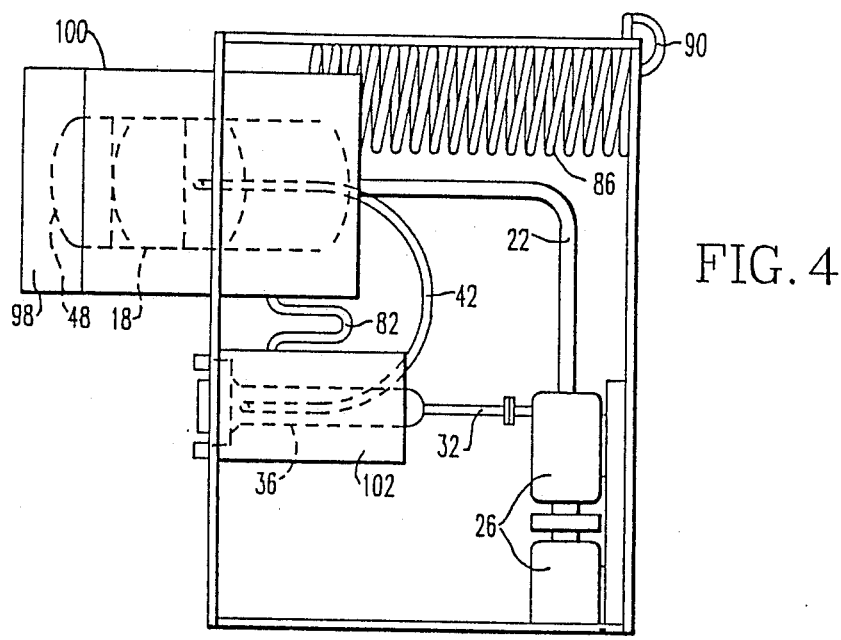
FIG. 4 is a side elevation of the apparatus taken with respect to the top view.

In FIGS. 2, 3, and 4 are shown a functioning test apparatus 10 with all of the major components thereof mounted on a platform member 96 to enable the apparatus to be moved to different locations to enable the meters to be tested under field conditions. In the showing of FIGS. 2-4, the principal components comprising the apparatus are as follows: weigh scale 76; mass flow meter being tested 16; batch tank of twenty-four gallon capacity 48 with suitable insulation 98; reservoir tank of thirty-three gallon capacity 18 with suitable insulation 100; motor driven pump 26; heater 36 with insulation therefor 102; and cooling coil 86. The connecting conduits are all metallic including the flexible conduits which are shown as corrugated. Some other conduits are also desirably flexible to minimize the effects of vibration. All of the gas and fluid conduits which connect to the batch tank 48 are flexible.

Various modifications of the present apparatus are possible. For example, only one gas-pressure control valve need be utilized to supply blanket gas to the batch tank 48 and the reservoir tank 18. In the showing of the portable embodiment of FIGS. 2-4, only the major components have been illustrated. The nitrogen supply tank is rapidly expanded during operation and is not a fixed part of the apparatus. The operating temperature range is dependent on the particular heat transfer fluid used. For the examples previously cited, operation has been achieved at elevated temperatures having range of about 200° C. to about 400° C.

Other embodiments of the invention will be apparent to those skilled in the art from a consideration of the specification or from practice of the invention disclosed herein. It is intended that the specification be considered as exemplary only with the scope and spirit of the present invention being indicated by the following claims.

I claim:

1. Test apparatus adapted to be connected to both a fluid outlet and a fluid inlet of a fluid mass flow meter to measure accurately the mass flow of high-temperature fluid passing through the meter being tested so that the meter can then be accurately calibrated, if required, to register accurately the mass flow therethrough of the high-temperature fluid, said apparatus comprising:

reservoir tank means for retaining selected organic fluid to be passed through the meter to be tested, said selected organic fluid having the characteristic of remaining fluid at the elevated temperatures at which mass fluid flow is to be measured with only a relatively low pressure of inert gas blanket maintained thereover, and said reservoir tank means having a fluid inlet and a fluid outlet;

fluid pump means having an inlet and an outlet, the inlet of said pump means being in fluid connection to the fluid outlet of said reservoir means, and said pump means operable to pump said selected organic fluid through said test apparatus;

organic fluid heater means having a fluid inlet and a fluid outlet, said heater means operable to heat organic fluid passing therethrough to the predetermined temperature at which the meter is to be tested, the fluid inlet of said heater means being in fluid connection with the outlet of said pump means; a first fluid flow control valve having an inlet and an outlet and operable to control the flow of fluid therethrough, the inlet of said first fluid flow control valve connected to the outlet of said heater means and the outlet of said first fluid flow control valve adapted to be connected to the inlet of said meter to be tested;

batch tank means for receiving and retaining the fluid which is passed through said meter during testing, said batch tank means having a fluid inlet and a fluid outlet, the fluid inlet of said batch tank means connected through a flexible fluid conduit to a second fluid flow control valve which is adapted to be connected to the outlet of said meter to be tested, and the fluid outlet of said batch tank means connected through a flexible conduit and a third fluid flow control valve to the inlet of said reservoir tank means;

inert gas supply means connected to said batch tank means through a gas-pressure-controlling valve means and a flexible gas conduit for maintaining a predetermined gas pressure in said batch tank means to maintain said heated organic fluid in a liquid state at the predetermined temperature at which said meter is to be tested;

inert gas supply means also connected through a gaspressure-controlling valve means to said reservoir tank means for maintaining a predetermined gas pressure in said reservoir tank means to maintain said heated organic fluid in a liquid state;

means for causing fluid to flow from said batch tank means to said reservoir tank means when said first fluid flow control valve is closed and said third fluid flow control valve is open; and weighing means associated with said batch tank means for weighing said batch tank means at the start of a test run and also when partially filled with said heated organic fluid at the end of a test run, said weighing means operating to measure the weight of said batch tank means and any fluid therein with a minimum of deflection in order to eliminate measured weight errors which might occur due to any appreciable distortion in said flexible conduits which connect to said batch tank means whereby the total mass flow of said heated organic fluid is measured by said meter undergoing test can be compared to the measured total mass flow of said organic fluid into said batch tank means.

2. The apparatus as specified in claim 1 wherein a first gas-pressure-relief valve is connected to said batch tank means to maintain said predetermined gas pressure in said batch tank means when heated organic fluid is being pumped into said batch tank means.

3. The apparatus as specified in claim 1 wherein a gas-pressure-relief valve is connected to said reservoir tank means to maintain a predetermined gas pressure in said reservoir tank means when said heated organic fluid is being transferred from said batch tank means to said reservoir tank means.

4. The apparatus as specified in claim 1 wherein a gas conduit interconnects the reservoir tank and the batch tank and has therein a gas flow control valve means for controlling when open the flow of inert gas therebetween and equalizing the gas pressure in the tanks to a predetermined gas pressure.

5. The apparatus as specified in claim 1 wherein said heated organic fluid is caused to flow from said batch tank means to said reservoir tank means by gravity flow.

6. The apparatus as specified in claim 1 wherein said heated organic fluid is caused to flow from said batch tank means to said reservoir tank means by maintaining a small gas pressure differential between said batch tank means and said reservoir tank means.

7. The apparatus as specified in claim 1 wherein a fluid recirculating conduit which includes a third fluid flow control valve connects between the outlet of said heater means and said reservoir tank means so that organic fluid can be recirculated through said heater means until a desired temperature therefore is obtained.

8. The apparatus as specified in claim 1 wherein a fluid conduit which includes a cooling fluid flow control valve and a fluid cooling means connects between the outlet of said batch tank means and said reservoir tank means so that fluid can be cooled, if desired, between individual test runs.

9. The apparatus as specified in claim 1 wherein a bypass conduit which includes a by-pass fluid flow control valve connects between the outlet of said heater means and the inlet of said batch tank means so that any meter undergoing test can be by-passed to test the apparatus.

10. The apparatus as specified in claim 1 wherein substantially all of the components comprising said apparatus are mounted on a supporting member to enable said apparatus to be moved to different locations to check meter calibration under field conditions.

* * * * *